UNITED STATES PATENT OFFICE 2,417,307

WELL DRILLING FLUID BASE MATERIAL AND PROCESS

Delmar H. Larsen, Los Angeles, Calif., assignor to National Lead Company, Los Angeles, Calif., a corporation of New Jersey No Drawing. Continuation of application Serial No. 380,306, February 24, 1941. This application November 24, 1943, Serial No. 511,621

9 Claims. (Cl. 252—8.5)

This invention relates to drilling fluids, particularly as used in the rotary method of boring and controlling oil and gas wells, and still more particularly in cases where salt water is encountered which has the effect of flocculating clay. This invention is an improvement on the Harth Patent 1,991,637, granted February 19, 1935. This application is a continuation of application Serial No. 380,306, filed February 24, 1941.

The Harth Patent 1,991,637 discloses the employment in a drilling fluid of generally concentrated colloidal materials, and more particularly emulsoid colloids, including starch. It is obvious, of course, that in order for the starch to act as an emulsoid colloid it should have been gelatinized in a manner well known to those skilled in the art, for example, as disclosed in the Marsden Patent 376,445, granted January 17, 1888, namely: by boiling in water with or without an alkali, such as caustic soda. In some cases that is, of course, not necessary since the temperature at the bottom of a deep well is frequently in the neighborhood of 180° F. and above, and accordingly even dry ungelatinized starch, when added to a drilling fluid at the top of the well, will become gelatinized at the bottom of the well. In shallow wells, however, where the temperature is not sufficiently high the practice has been to gelatinize the starch before addition to the drilling fluid in the manner described in the Marsden patent.

The use of starch as a concentrated drilling mud colloid has particular application in areas where rock salt is drilled through, particularly in the Permian basin of West Texas. In this particular district the wells are comparatively shallow and temperatures comparatively low, so that the mud at no time attains a temperature high enough to gelatinize any ordinary starch which may be added. It is therefore customary in this district, when it is desired to add starch to the drilling mud system, to cook the starch up with water, frequently in combination with a small amount of caustic soda, to promote gelatinization, and to add the cooked slurry so obtained to the drilling mud. The effects obtained by this procedure are relatively satisfactory, but the method itself is extremely cumbersome. It is necessary to have at the well a large iron tank fitted with steam coils in which the cooking can take place. Furthermore, it has been found generally necessary to make new additions of cooked starch almost daily in order to preserve the beneficial effects of the treatment, and this necessitates the steam tank being confined to one well over a considerable length of time. Moreover, many wells are drilled with Diesel power instead of steam power, and where such is the case the method is not used at all because of the difficulty of cooking a large amount of liquid without steam.

I have found that if a thin-boiling starch is employed, prepared by treatment of starch with oxidizing agents or acids, such a starch will be particularly useful in the treatment of well drilling fluids; for it is adapted to produce a low viscosity fluid viz. 4–12 cpe. with a high percentage of colloid and, therefore, is capable of resulting in a low water loss viz., 10 c. c. A. P. I. at a suitable drilling viscosity, which is usually between 15 and 60 centipoises (Stormer). Such a thin-boiling starch is also gelatinizable in cold water and, therefore, may be added in substantially dry form; this is of advantage because it may be furnished in bags or other containers.

One of the objects of this invention, therefore, is to provide such a drilling fluid base material, a process for the employment of such a material in the treatment of well drilling fluids, and a well drilling fluid having a low water loss at a suitable drilling viscosity.

Further objects will appear from the detailed description in which a number of examples will be given; it is to be understood, however, that various changes, embodiments and modifications are contemplated within the scope of this invention as claimed.

Generally stated and in accordance with illustrative embodiments of this invention a thin-boiling starch may be added in its dry form to a drilling mud, and virtually the same beneficial properties will be thereby imparted to the drilling mud that would have been the case had the starch been cooked with water and the entire liquid mass added to the drilling fluid. Virtually any starch may be prepared as a thin-boiling starch and will serve to carry out the process of this invention. For example, potato, wheat, corn, sweet potato, arrowroot, sago, arum, tapioca, rice, and other starches may be used, or in some cases starch flours themselves, particularly those relatively poor in gluten content, such as rice flour or potato flour, may be used. Generally speaking, it is preferred to mix one part of starch with two to three parts of water and heat this suspension with agitation to a temperature in excess of the swelling temperature of the starch used. The suspension is then dried, for example, by spreading on heated drums, or by spraying into hot air, and where desired the flakes or pellets so obtained may be further reduced in size.

It will be understood that there are other mechanical treatments than cooking at atmospheric pressure which produce the equivalent of a starch pregelatinized by a simple cooking process. For example, starch, as it is usually obtained, ordinarily contains between 20 and 25 percent natural moisture, and this is sufficient moisture for gelatinization and swelling of starch, provided the mechanical features of the processing equipment are such as to utilize all of the moisture. For example, naturally moist starch may be fed between rollers which are heated and which have a considerable pressure applied to them, in accordance with Hoppler Patent No. 1,878,852, or the naturally moist starch may be heated in an autoclave. In the latter case the pressure may be suddenly released in order to fluff the gelatinized starch, as described in Anderson Patent No. 679,289. Again, the starch either with or without added moisture can be passed into superheated steam, or may be jetted into extremely hot gas.

In the processing of the starch in order to pregelatinize it in accordance with this invention, it may be treated with chemicals which effectively lower the temperature necessary to disrupt the starch grains, such as caustic soda, urea, ammonium thiocyanate, and the like. Some of these chemicals, such as caustic soda, effectively lower the swelling temperature to ordinary room temperatures, so that it is merely necessary to stir the starch into the solution of the material. The starch may be previously suspended in a non-hydrophilic, non-reacting suspension medium, such as a liquid hydrocarbon, an alicyclic alcohol, an alcohol or ketone, or the like, in order to facilitate the treatment with the hydrating chemical, such as caustic soda.

In accordance with this invention, substances are added to the starch, either before it is gelatinized or during the gelatinizing process, which have the effect of reducing or preventing the increase of the consistency of the colloidal suspension eventually obtained when the pre-gelatinized starch is added thereto. Such consistency-inhibiting agents include among others oxidizing agents, such as perborates, permanganates, persulphates, hypochlorites, chlorine gas, barium dioxide, and the like; and such acidic materials as formic and acetic acids, sulphur dioxide, mineral acids, and the like; nitrogen containing compounds, such as chloramides, amino acids, and the like, and others. Furthermore, in order to produce a thin-boiling starch, a simple cooked suspension of starch water may be subjected to drastic mechanical shearing action as in a colloid mill before drying the suspension, which will produce what will be designated as a "sheared" colloid and will likewise result in a lower eventual viscosity. Additionally, a wetting agent may be employed in connection with the aforesaid chemicals in order to facilitate their action; examples of these are: dialkyl esters of sodium sulfosuccinic acid, such as the "Aerosol" compounds, various sulfated long-chain alcohols, various sodium alkyl naphthalene sulfonates, various sulfonated alkyl hydrocarbons and their salts, various sulfonated ethers, such as the "Triton" compounds, and the like.

It may be desirable to include a high boiling, water affinitive dispersing agent such as glycerol, diethylene glycol, ethylene glycol mono-butyl ether, sucrose octoacetate, or the like to the starch during gelatinizing in order to make it more easily dispersible after it has been dried. The desirability of including one of these compounds depends to a certain extent upon the degree to which the starch has been dried and the fineness to which it is ground. In most cases it will be found that the addition of these substances results in a quicker gelatinization, but if the drying of the gelatinized starch has not been carried to an extreme and if it has been quite finely ground, the improvement resulting from the inclusion of substances of this class may be so small as to not warrant the additional expense. It will be understood, however, that the addition of such humectants to pre-gelatinized starch forms a part of this invention.

Where the products of the processes of this invention are used in muds containing an appreciable amount of dissolved salt, say upwards of 1 or 2 per cent, it will generally be found that fermentation or mold formation is sufficiently inhibited by the presence of the salt that no provision need be made for preserving the starch against the action of microorganisms. However, where the products of this invention are used in drilling muds free from salt, it may be desirable to incorporate, either with the drilling mud or with the gelatinized starch itself, a suitable preservative. Many are available and well known. Mention may be made of mercuric iodide, copper sulphate, sodium benzoate, thymol, ethyl hexyl alcohol, sodium salts of chlorinated phenols, and the like. Generally speaking, quite small amounts, of the order of magnitude of .01 to .1 per cent by weight of the drilling mud, will suffice.

The dry amylaceous colloid gelatinizable in cold water may also be mixed or combined with various gums, such as gum tragacanth, agar-agar, etc. The dry amylaceous colloid gelatinizable in cold water may also be mixed with a mud base, examples of which are a weighting material, such as barytes, iron oxide or with a concentrated colloidal clay such as bentonite and fuller's earth or an ordinary drilling clay singly or in combination. The clay or bentonite, and fuller's earth serve to impart viscosity characteristics to the drilling fluid in order to secure suspension of the cuttings and weighting material and in order to impart thixotropic properties to the drilling fluid. There can thus be provided a substantially dry well-drilling fluid material capable of use as a well-drilling fluid by the addition of water or by addition to a well-drilling fluid already in use.

A number of examples will now be given to illustrate the application of the well drilling fluid base material to drilling fluids; and while the example given is that of tapioca starch, it is understood that various starches may be so employed alone or combined with the various agents previously described.

*Example 1.*—100 parts of tapioca were boiled with 400 parts of distilled water and 0.7 part of barium peroxide. This mixture was then dried and ground, and 1.1 parts thereof added to 100 parts of a fresh water drilling mud consisting of a Mojave Desert clay and distilled water. The viscosity of the mud was increased by the treatment from 4 to 9 cpe., as measured by a Stormer viscosimeter, operated at 600 R. P. M.; at the same time the water loss as measured by the published American Petroleum Institute tentative specification for determining water loss in drilling muds was lowered from 27 to 9 cc.

*Example 2.*—100 parts of tapioca were boiled with 400 parts of water and 1 part of barium peroxide, and the suspension dried and ground. 1.7 parts of this product were added to 100 parts of a drilling mud consisting of Florida fuller's earth in saturated salt water. The water loss was decreased from 90 cc. to 10 cc., while the viscosity was raised from 10 cpe. to 12 cpe., this being a smaller increase in viscosity than in previous examples because of the larger amount of barium peroxide used.

*Example 3.*—100 parts of cornstarch are digested with 200 parts of 1% hydrochloric acid for six hours at 50° C., then cooled, washed, and filtered until reasonably acid-free, then flash heated on steam heated rollers so that gelatinization takes place as the result of the starch being heated to above its gelatinization temperature before dehydration, and finally dried on the same steam heated rolls to dryness. The resulting product is ground to pass 10 mesh, and will disperse in salt-laden or fresh water drilling fluids to give a very low water loss with a fairly low viscosity as well.

*Example 4.*—The process of Example 3 is carried out except that after the washing treatment 100 parts of a gum, such as powdered gum tragacanth, are intimately admixed with the starch before gelatinization and drying. This mixture will be found to have enhanced water-loss-reducing properties over the product of Example 3 on a weight for weight basis provided a good commercial grade of gum tragacanth is used, but will be more expensive than the product of Example 3.

*Example 5.*—To one part of the product resulting from Example 3 above, 20 parts of ground —325 mesh barium sulphate is added. 100 pounds of this product when made up to a barrel of 42 gallons with salt water will produce a drilling fluid satisfactory in water loss, viscosity, and stability. If desired, this material may be added to an already prepared drilling mud whereby the water loss of the latter will be lowered and the density will be increased.

*Example 6.*—One part of the product resulting from Example 3 is mixed with 5 parts of powdered bentonite. This mixture will be particularly adapted for lowering water loss in fresh water drilling muds, about 10 to 15 pounds per barrel of mud effecting a suitable water loss lowering. It may be advisable to add a preservative such as paraformaldehyde to the extent of .01% to the mud system.

*Example 7.*—Example 3 is carried out, except that before the washed mixture is passed to the gelatinization rolls, 5 parts of bentonite for each part of dry starch present is admixed, additional water being added, if necessary, to get the material to spread on the rolls. This material may be used in similar fashion to the product of Example 6.

*Example 8.*—Either Example 6 or Example 7 is carried out substituting fuller's earth of the Florida-Georgia type. This material may be used in the same proportion as specified under Example 6, but will be particularly adapted to drilling muds containing salt.

Having thus described the invention, what is claimed is,

1. In the art of boring or controlling wells by an aqueous well drilling fluid, the process comprising, adding to the fluid a thin-boiling amylaceous colloid which is gelatinizable in cold water and adapted to produce a low viscosity fluid with a high percentage of the colloid.

2. In the art of boring or controlling wells by an aqueous well drilling fluid, the process comprising, adding to the fluid a thin-boiling starch which is gelatinizable in cold water and adapted to produce a low viscosity fluid with a high percentage of the colloid.

3. In the art of boring or controlling wells by an aqueous well-drilling fluid, the process comprising, adding to such a fluid a thin-boiling starch which is gelatinizable in cold water and in an amount sufficient to attain a low water loss at a suitable drilling viscosity.

4. In the art of boring or controlling wells by an aqueous well-drilling fluid, the process comprising, adding to such a fluid containing a clay-flocculating salt, a thin-boiling starch which is gelatinizable in cold water and in an amount sufficient to attain a low water loss at a suitable drilling viscosity.

5. In the art of boring or controlling wells by an aqueous well-drilling fluid, the process comprising, adding to such a fluid bentonite and a thin boiling starch which is gelatinizable in cold water and in an amount sufficient to attain a low water loss at a suitable drilling viscosity.

6. In the art of boring or controlling wells by an aqueous well-drilling fluid, the process comprising, adding to such a fluid containing a clay-flocculating salt, a fuller's earth of the Georgia-Florida type and a thin-boiling starch which is gelatinizable in cold water and in an amount sufficient to attain a low water loss at a suitable drilling viscosity.

7. In the art of boring or controlling wells by an aqueous well-drilling fluid, the process comprising, adding to such a fluid a thin-boiling starch which is gelatinizable in cold water and in an amount sufficient to attain a low water loss at a suitable drilling viscosity, together with sufficient of paraformaldehyde to inhibit fermentation.

8. An aqueous well-drilling fluid containing a thin-boiling amylaceous colloid which is gelatinizable in cold water and of an amount sufficient to produce a water loss of not more than about 10 cc. A. P. I. at a drilling viscosity of between 15 and 60 centipoises Stormer.

9. An aqueous well-drilling fluid containing a thin-boiling starch which is gelatinizable in cold water and of an amount sufficient to produce a water loss of not more than about 10 cc. A. P. I. at a drilling viscosity of between 15 and 60 centipoises Stormer.

DELMAR H. LARSEN.

REFERENCES CITED

The following references are of record in the file of this patent:

UNITED STATES PATENTS

| Number | Name | Date |
| --- | --- | --- |
| 2,056,104 | Hueter | Sept. 29, 1936 |
| 2,146,732 | Grebe | Feb. 14, 1939 |
| 2,212,557 | Bauer | Aug. 27, 1940 |
| 2,259,419 | Hefley | Oct. 14, 1941 |
| 2,336,171 | Freeland | Dec. 7, 1943 |
| 2,364,434 | Foster | Dec. 5, 1944 |
| 2,216,179 | Bauer | Oct. 1, 1940 |